United States Patent
Gao et al.

(10) Patent No.: US 11,218,090 B2
(45) Date of Patent: *Jan. 4, 2022

(54) COMPACT PIEZOELECTRIC INERTIAL DRIVE STAGE

(71) Applicant: Thorlabs, Inc., Newton, NJ (US)

(72) Inventors: Renlong Gao, Shanghai (CN); Guocheng Xu, Shanghai (CN); Guobiao Wu, Shanghai (CN)

(73) Assignee: Thorlabs, Inc., Newton, NJ (US)

( * ) Notice: Subject to any disclaimer, the term of this patent is extended or adjusted under 35 U.S.C. 154(b) by 447 days.

This patent is subject to a terminal disclaimer.

(21) Appl. No.: 16/252,276

(22) Filed: Jan. 18, 2019

(65) Prior Publication Data

US 2019/0229647 A1 Jul. 25, 2019

Related U.S. Application Data

(60) Provisional application No. 62/619,395, filed on Jan. 19, 2018.

(51) Int. Cl.
*H02N 2/02* (2006.01)
*H02N 2/10* (2006.01)
*H02N 2/00* (2006.01)

(52) U.S. Cl.
CPC ............ *H02N 2/025* (2013.01); *H02N 2/006* (2013.01); *H02N 2/101* (2013.01)

(58) Field of Classification Search
CPC ......... H02N 2/006; H02N 2/025; H02N 2/101
See application file for complete search history.

(56) References Cited

U.S. PATENT DOCUMENTS

| 7,462,974 | B2 | 12/2008 | Matsuki | |
| 7,535,661 | B2 | 5/2009 | Matsuki | |
| 8,253,306 | B2 * | 8/2012 | Morishima | H02N 2/025 310/329 |
| 8,520,327 | B2 | 8/2013 | Thomas et al. | |
| 8,593,033 | B2 | 11/2013 | Culpi et al. | |
| 2007/0241640 | A1 | 10/2007 | Matsuki | |

(Continued)

FOREIGN PATENT DOCUMENTS

| EP | 1 941 607 B1 | 9/2013 |
| RU | 2 603 353 C1 | 11/2016 |

OTHER PUBLICATIONS

International Search Report with Written Opinion of the International Searching Authority issued by the Federal Institute of Industrial Property of Russia, for corresponding International Patent Application No. PCT/US2019/014336, dated Apr. 18, 2019.

(Continued)

*Primary Examiner* — Emily P Pham
(74) *Attorney, Agent, or Firm* — Myers Wolin, LLC

(57) ABSTRACT

Disclosed is a piezoelectric inertial drive stage including a piezoelectric inertial driver, a slider and a holder. The driver includes a mounting portion for the mounting on the holder, a friction portion coupling to the slider, a flexure portion between the mounting portion and friction portion, a piezoelectric element with a first end bonded to the mounting portion and a second end bonded to a movement portion, the movement portion transferring the motion of the piezoelectric element to the friction portion to drive the slider.

18 Claims, 8 Drawing Sheets

(56) References Cited

U.S. PATENT DOCUMENTS

2015/0076965 A1  3/2015  Culpi
2019/0229647 A1  7/2019  Gao et al.

OTHER PUBLICATIONS

Newport Corporation, "Agilis Piezo Linear Stage, 27 mm travel, AG-LS25-27, Overview and Technical Specifications," downloaded from www.newport.com on Apr. 18, 2019, pp. 1-2.

Edmund Optics Worldwide, "26mm Travel Piezo Positioning Stage, product description and specifications," downloaded from www.edmundoptics.com on Jan. 5, 2018, pp. 1-7.

Pi, Motion Positioning, "Q-521, Q-Motion Miniature Linear Stage, Smallest linear stage with position control, high resolution and attractive price," Datasheet, Oct. 6, 2016, Karlsruhe, Germany.

Pi, Motion Positioning, "Q-55, Q-Motion Miniature Linear Stage, Piezomotors for Small Dimensions, High Resoution and a Favorable Price," Datasheet, Oct. 15, 2015, Karlsruhe, Germany.

Micronix, USA, Precision Motion Solutions, "Piezo Positioner, pp. 18, Key Features and Description," downloaded from www.micronixusa.com on Apr. 18, 2019.

Smaract Perfect Motion, "SLC-17 Series Nanometer Precision Linear Positioner," Catalog, 2016, pp. 45-49, Olgdenburg, Germany.

The extended European search report with European search opinion issued by the European Patent Office for corresponding European Patent No. 20216562.7, dated Jun. 9, 2021.

* cited by examiner

COMPACT PIEZOELECTRIC INERTIAL DRIVE STAGE

CROSS REFERENCE TO RELATED APPLICATIONS

This application claims the benefit of U.S. Provisional Patent Application No. 62/619,395 filed on Jan. 19, 2018. The disclosure of U.S. Provisional Patent Application 62/619,395 is hereby incorporated by reference.

FIELD OF THE INVENTION

This invention relates to a compact drive stage, and more particularly relates to a compact piezoelectric inertial drive stage.

BACKGROUND

Based on inverse piezoelectric effect, piezoelectric actuators or motors could transfer electrical field into mechanical strain or movement, which could be used in some motion control applications. A simple piezoelectric actuator could be a piezoelectric element, which could be a monolayer polarized piezoelectric material with electrodes. Under a certain electrical field, the piezoelectric element could deform (expand, contract or shear) in one direction, but the strain is typically lower than several parts per thousand, which means the displacement of the moving part of most monolayer piezoelectric elements with several millimeters' dimension are limited to several microns. Then a multilayer structured piezoelectric actuator, consisting of stacked piezoelectric layers (mechanically in series) that are sandwiched between interdigitated electrodes (electrically in parallel) is used to add up the deforming of each layer to achieve a displacement up to a few hundred microns. But the strain still remains several parts per thousand according to the mechanically bond in series. Furthery, a mechanical amplifier with specified structure is used to amplify the displacement of the piezoelectric actuator, but the amplified displacement is still limited to several millimeters.

To get rid of the limited displacement and achieve a larger travel range, a piezoelectric motor or called piezoelectric drive system has been developed with typically a stator or called driver and a slider, which has a small movement in a cycle of the driver driven by a piezoelectric element and could accumulate small movements when repeating this cycles many times to finally achieve large travel. The travel range of such a piezoelectric motor is typically limited only by the travel range of the slider. Piezoelectric inertial motor or called piezoelectric inertial drive stage is one kind of piezoelectric motor, in which the piezoelectric element could be integrated into the stator or the slider. The slider could achieve a small movement in a cycle of the driving of the piezoelectric element due to the inertia of the masses of the components involved.

The documents US 20070241640 A1 (U.S. Pat. No. 7,535,661 B2) and U.S. Pat. No. 7,462,974 B2 describe the piezoelectric inertial driving actuator comprising a fixing member, a moving piezo element, an oscillation substrate with spring, a moving body that is arranged on the oscillation substrate and is moved by inertia with the substrate. These designs have not introduced any special design on the spring.

The device in patent U.S. Pat. No. 8,520,327 B2 is a typical piezoelectric inertial motor with piezoelectric element integrated in the stator or called "piezoelectric inertia driver." This piezoelectric inertia driver consists of a rigid body portion and a continuous, flexible resilient member with a drive surface portion, an axially rigid portion and an S-shaped resilient portion. This patent has mainly claimed the S-shaped resilient portion and has not introduced any special design on the drive surface and the stiffness of drive portion.

The patent U.S. Pat. No. 8,593,033 B2 describes a piezoelectric motor with multiple piezoelectric elements as stator, to drive the slider by individually control of the multiple piezoelectric elements. This patent does not have any flexure portion to enhance the homing of the piezoelectric elements.

The device in patent US 20150076965 A1 (U.S. Pat. No. 9,312,790 B2) is a typical piezoelectric inertial motor with piezoelectric element integrated in the stator. This patent has claimed a flexure portion consisting of a tapered spring having a first end with a first width, a second end with a second width, and a turn portion with a turn width, wherein the first width and the second width are smaller than the turn width, which is different from the S-shaped resilient portion in patent U.S. Pat. No. 8,520,327 B2. This patent has also introduced a friction pad on the drive surface and preload member but the stiffness of the flexure portion is low and limits the driver's performance.

The present application discloses a series of designs of the flexure portion with high stiffness and compact structure in the piezoelectric inertial driver for the inertial drive stage. The flexure portion is neither an S-shaped resilient portion nor similar to the tapered spring in US 2015/0076965 A1. The high stiffness flexure portion enables fast response of the drive portion and high frequency operation of the cycle motion of the piezoelectric elements, and finally enhances the travelling speed of the slider and axial force generated by the friction.

Based on an embodiment of the present invention, the piezoelectric inertial drive stage design has up to ~100 mm/s speed and 10N axial pushing force, which are higher than other commercial piezoelectric inertial drive stage products. Therefore, the device according to embodiments of the present invention would be competitive and attractive in the market of piezoelectric inertial drive stage.

SUMMARY

One embodiment of the present invention provides a piezoelectric inertial drive stage, including: a holder; a slider supported by a holder, the slider traveling on a smooth track with a travel range with respect to the holder; a piezoelectric inertial driver coupled to the holder and operable to move the slider; the driver including: a mounting portion to connect the driver to the holder; a friction portion configured to engage with the slider; a movement portion with a first end connected to a piezoelectric element and a second end connected to the friction portion; the piezoelectric element with a first end bonded to the mounting portion and a second end bonded to the movement portion; and a flexure portion with a first end connected to the mounting portion and a second end connected to the friction portion; wherein the flexure portion further includes a plurality of connection rods with substantially parallel connections and separated by slots; wherein the movement portion transferring a motion of the piezoelectric element to the friction portion to drive the slider.

One embodiment of the present invention provides a piezoelectric inertial driver, including: a mounting portion to connect the driver to a holder; a friction portion configured to engage with a slider; a movement portion with a first end connected to a piezoelectric element and a second end connected to the friction portion; the piezoelectric element with a first end bonded to the mounting portion and a second end bonded to the movement portion; and a flexure portion with a first end connected to the mounting portion and a second end connected to the friction portion; wherein the flexure portion further includes a plurality of connection rods with substantially parallel connections and separated by slots; wherein the movement portion transferring a motion of the piezoelectric element to the friction portion to drive the slider.

DETAILED DESCRIPTION OF THE PREFERRED EMBODIMENTS

Figure 1:
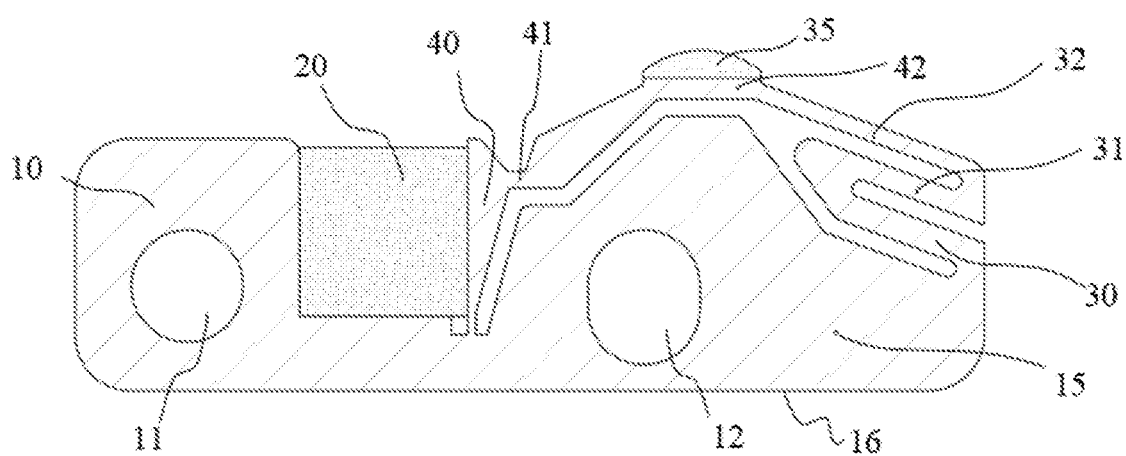
FIG. 1 is a piezoelectric inertial driver according to an embodiment of the invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 5:
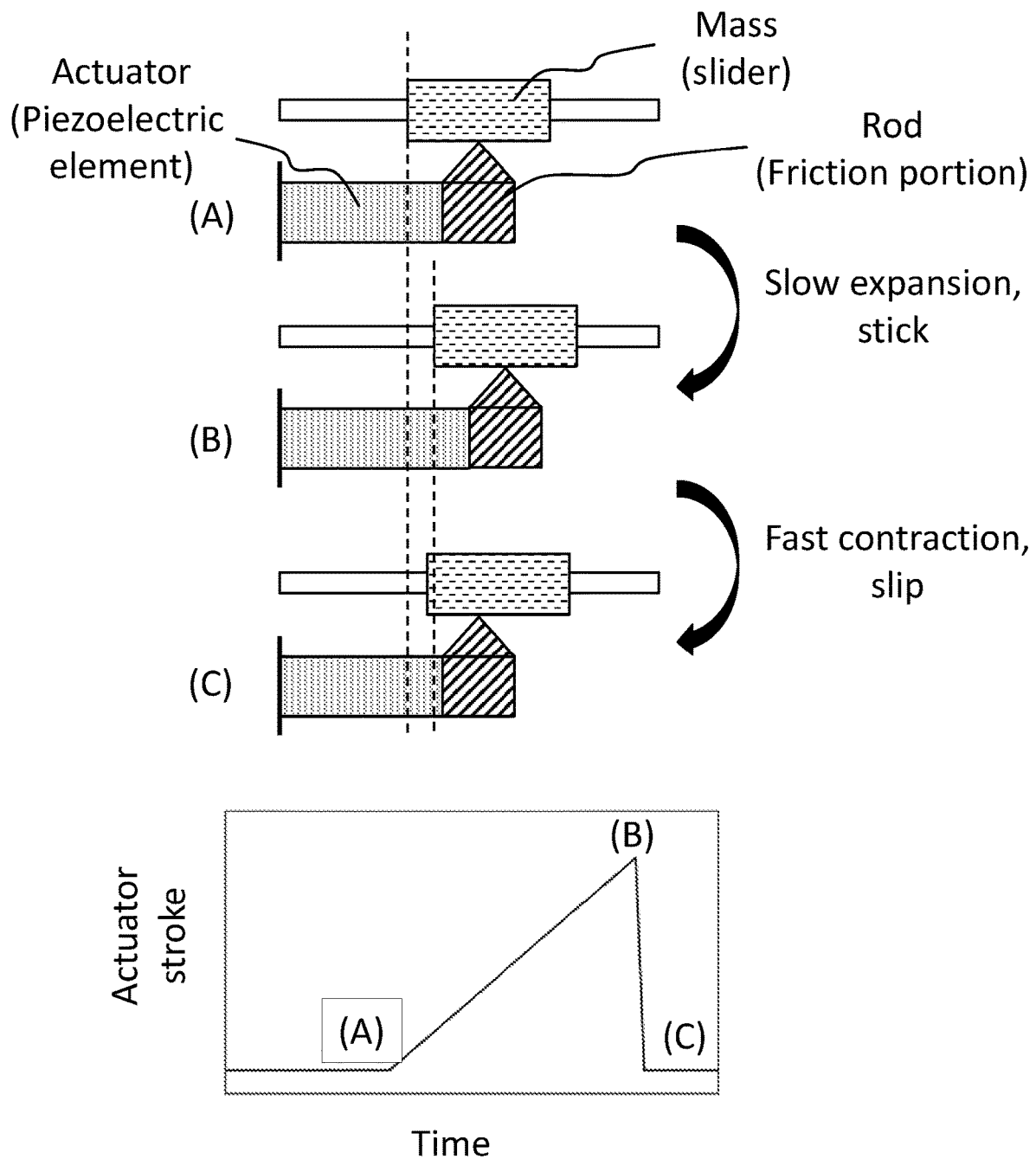
FIG. 5 illustrates the operation of a piezoelectric inertial driving mechanism.

FIG. 5 illustrates the basic mechanism of piezoelectric inertial driving. As shown in FIG. 5, the basic inertial driving system consists of three main parts: an actuator (piezoelectric element), a rod (friction portion) and a mass (slider). In (A), the drive is at the home position. In (B), under a slow ramp voltage, a piezoelectric element with one end fixed and the opposite end pushing the friction portion to rub the slider moving forward (this is the "stick" process). In (C), the voltage suddenly drops off, the piezoelectric element, as well as the friction portion would suddenly get back to home position, and the friction portion will "slip" backward with the slider (this is the "slip" process). The bottom of FIG. 5 shows the deflection of the actuator as a function of time for a cycle of (A), (B) and (C).

Because of the inertia of the slider, the drawback during "slip" process will be less than the forward travelling distance during "stick" process. Then the slider will finally move forward a little after a "stick-slip" cycle. Repeat the cycles and the slider will travel forward. For backward travelling, the cycle would turn conversely to "slip-stick". To enhance the contraction/homing of the piezoelectric element and friction portion, a flexure/spring is usually used to push them back. Most recent designs, as well as an embodiment of the present invention, mainly focus on the design of the flexure/spring parts and the integrating with other essential parts.

In one embodiment, the piezoelectric inertial drive stage includes a piezoelectric inertial driver, a slider which could be a linear rail, a bearing or something has a smooth track and certain travel range, a holder that combines the stator and slider together and other essential components. In our patent application, we mainly focus on the design of the piezoelectric inertial driver.

Figure 10:
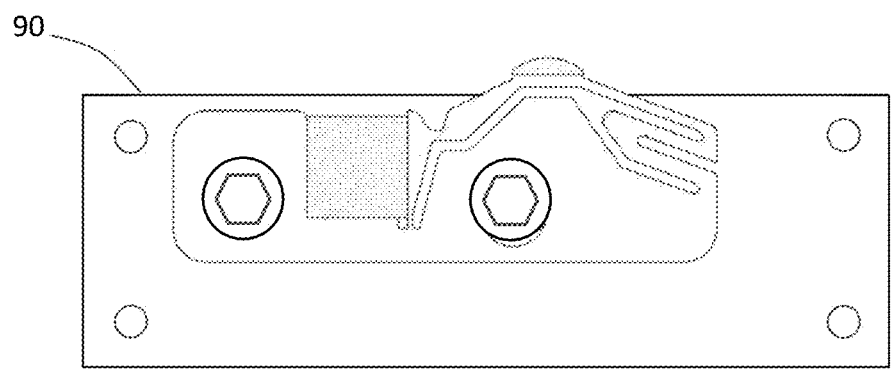
FIG. 10 shows a piezoelectric inertial driver mounted on a holder according to an embodiment of the invention.

A first embodiment of the driver is shown in FIG. 1 which illustrates a front view of the piezoelectric inertial driver that includes a mounting portion 10, a piezoelectric element 20, a flexure portion 30, a friction portion 35 and a movement portion 40. All the portions except piezoelectric element 20 and friction portion 35 belong to a monolithic structure that is made from a single piece of metal material such as steel, bronze, etc. to keep high stiffness of the whole structure, achieve compact and cost effective design. The mounting portion 10 has mounting holes 11 and 12 for mounting the driver on a holder and this portion will be kept static during driving, which makes the whole driver work as a stator. FIG. 10 shows an example of a piezoelectric inertial driver mounted on a holder 90. The portion 15 connects the mounting portion 10 and flexure portion 30. The point 16 under portion 15 is used to apply preload between the driver and slider. The flexure portions 30 and 31 are several parallel connection rods with angle tolerance in the range from −20 degrees to +20 degrees. The number of the rods, width of each individual rod and space between two adjacent rods could be adjusted to obtain preferred stiffens of the flexure portion. The portion 32 connects the flexure portion 31 and friction portion 35. The portion 41 connects the movement portion 40 and friction portion 35. One of the moving surfaces of the piezoelectric element 20 is bonded to an interface of mounting portion 10 via an adhesive or other suitable attachable means. The other moving surface of the piezoelectric element 20 is bonded to an interface of movement portion 40 via an adhesive or other suitable attachable means. The friction portion can be made separately or together with the flexure in one piece. In this embodiment the friction portion 35 is made from a wear-resistant material such as ceramics, non-organic composites or covered by wear-resistant coating such as polymers, non-organic composite coating, etc. to enhance the wear resistance, stability and lifetime during long term operation and it is bonded to the portion 42 via an adhesive or other suitable attachable means.

For a movement cycle of the piezoelectric inertial driver, the piezoelectric element 20 would expand under a certain electrical signal, push the movement portion 40 to move forward as mounting portion 10 is fixed. The portion 41 would transfer the movement along its length direction from movement portion 40 to friction portion 35 and flexure portion 30 and avoid the transferring of movement along other directions. Then the friction portion 35 would stroke out and the flexure portion 30 would elastically deform (elongation and bending for this embodiment). The stroking friction portion 35 would rub against the slider, which is in well contact with the friction portion 35 and can travel smoothly along or tangentially along the friction force direction. With a slow ramped electrical field, the piezoelectric element 20 would drive the friction portion 35 to stick with the slider and rub the slider to move forward by static friction; then the electric field suddenly drops down to zero, the expanded piezoelectric element 20 and the deformed flexure portion 30 would recover to home position quickly, which will make the friction portion rub backward. The backward rubbing needs to be quick enough to make the friction portion 35 slip from the slider, at the same time the slider would move backward a little by the sliding friction. The backward slipping distance is smaller than the forward sticking distance because of the inertia of the mass of the slider. Therefore a whole movement cycle of the piezoelectric inertial driver would end up with a small forward moving distance and the mechanism is called "stick-slip" driving. On the other hand, to achieve a backward travelling, the piezoelectric element 20 would firstly drive the friction portion 35 to slip forward with the slider and then slowly recover home position to make the friction portion 35 stick backward with the slider and finally make the slider move backward a small distance. The portion of the slider contacted with the friction portion 35 is made from a wear-resistant material such as ceramics, metal with polymer or non-organic composite coating etc. to enhance the wear resistance, stability and lifetime during long term operation and it can be made separately and bonded to the slider via an adhesive or other suitable attachable means or together with the slider in one piece.

The stroke distance of friction portion 35 and deformation strain depend on the stiffness of the flexure portion 30. Thus through the adjustment of the number of the connection rods in the flexure portion, width of each individual rod and space between two adjacent rods, the stroke distance of the friction portion could be adjusted. With preferred stiffness and stroke value, the driver could drive a slider with a linear rail to travel in both forward and backward directions, or the driver could drive a slider with bearing to rotate in both clockwise and anticlockwise directions.

When driving the piezoelectric inertial driver under high frequency, the slider would travel with high speed and the "stick" is no more applicable and the driving mechanism turns into a "slip-slip" mode. The high frequency driving needs high stiffness flexure portion to enable fast response of the drive portion and high frequency operating of the cycle motion of the piezoelectric elements. So in this embodiment, the stiffness of the flexure portion 30 is designed and adjusted with high stiffness for high frequency operation, to achieve high travelling speed and high axial force.

Figure 2:
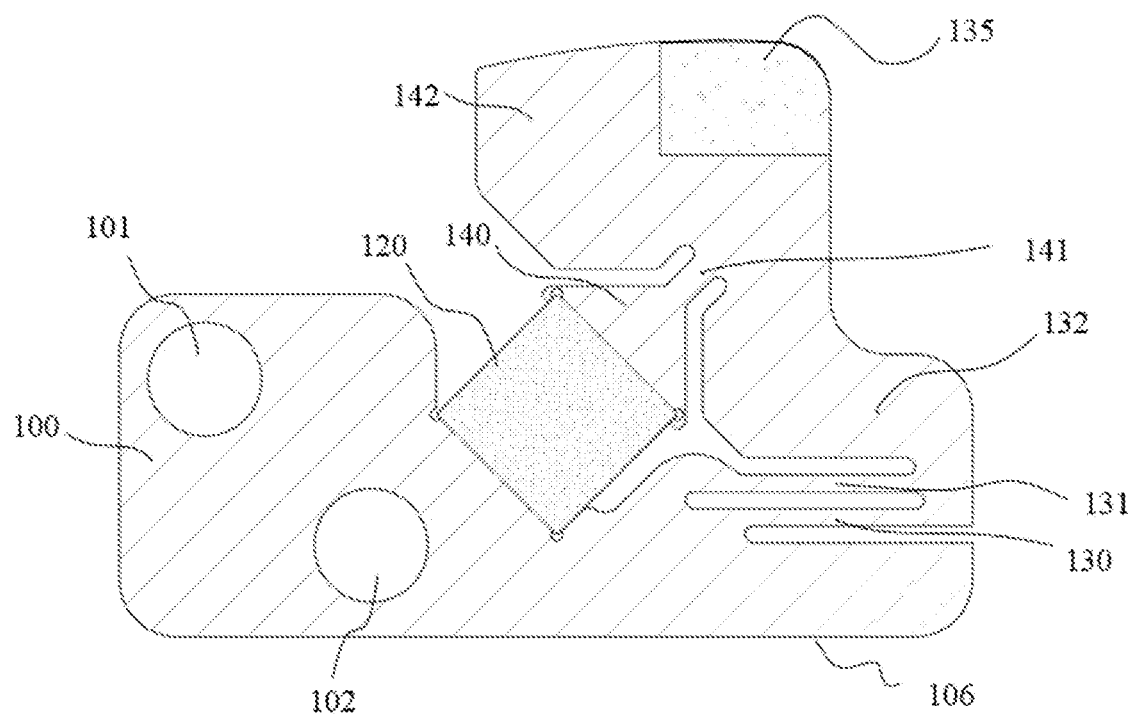
FIG. 2 is a piezoelectric inertial driver according to another embodiment of the invention.

A front view of the driver according to a second embodiment is shown in FIG. 2. Similar to the first embodiment, this piezoelectric inertial driver includes a mounting portion 100 with two mounting holes 101 and 102, a piezoelectric element 120, a flexure portion 130, a friction portion 135 and a movement portion 140. The connection and movement cycle is also similar as the previous embodiment. The differences are listed as follows: the flexure portion 130 is horizontal and the angle between connection rods is also an adjusting parameter to adjust the stiffness; the friction portion 135 is larger and has two surfaces contacted with portion 142 for better mounting; the portion 132 for connecting flexure portion 131 and friction portion 135 is thicker so that the whole structure has higher stiffness. In the second embodiment, the stiffness of the flexure portion 130 is designed to be higher than the first embodiment to achieve higher performance under high frequency driving.

Figure 3:
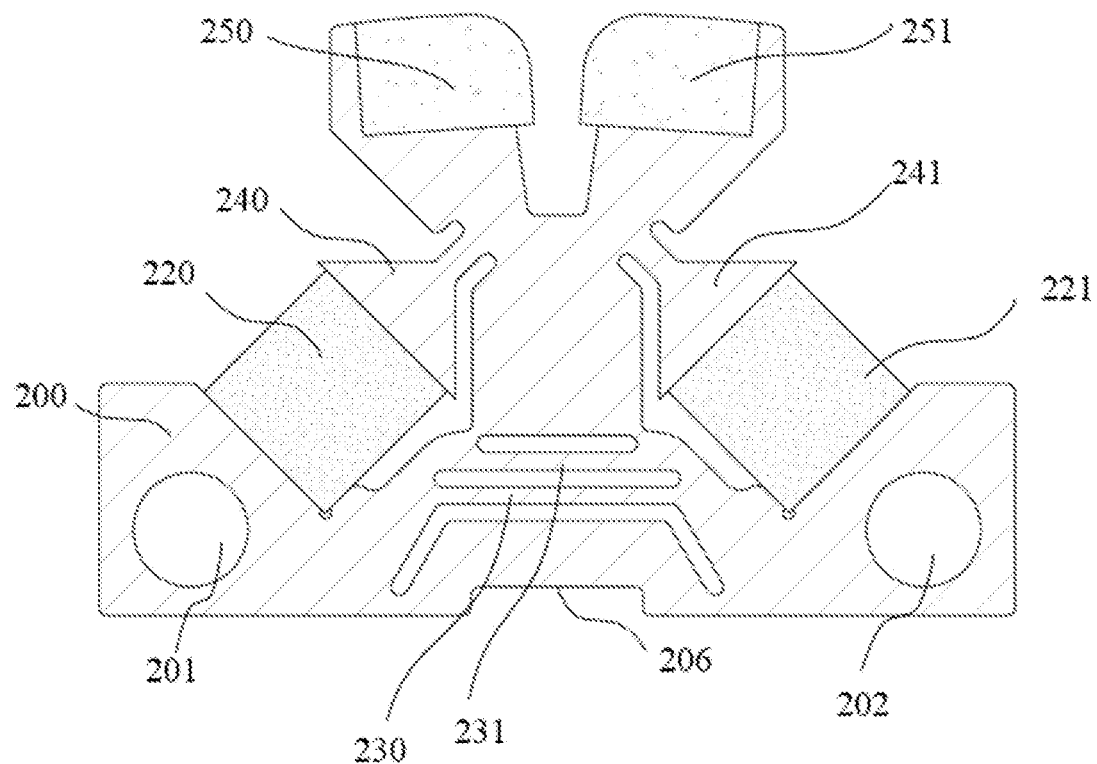
FIG. 3 is a piezoelectric inertial driver according to another embodiment of the invention.
Figure 4:
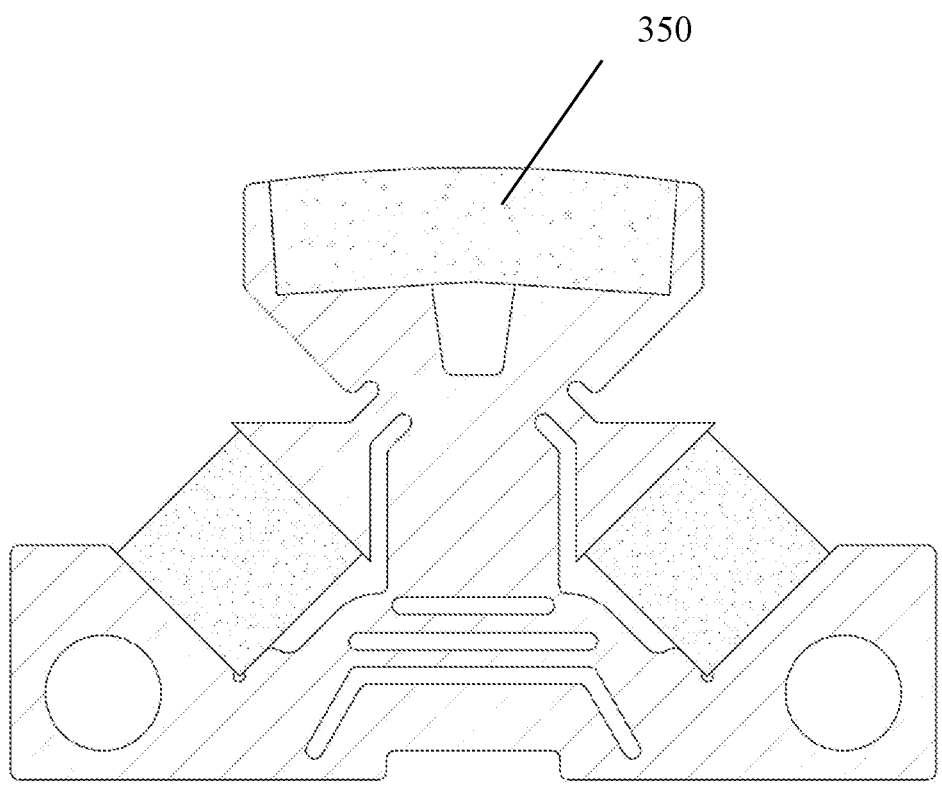
FIG. 4 is a piezoelectric inertial driver according to another embodiment of the invention.

FIG. 3 shows a third embodiment, which combines two drives together. This embodiment has a symmetrical structure with two mounting holes 201 and 202, two piezoelectric elements 220 and 221, two movement portions 240 and 241 and one or two friction portions as 250 and 251, sharing the flexure portions 230 and 231 in the middle. A similar embodiment with one friction portion 350 is shown in FIG. 4. The flexure portions 230 and 231 are kept horizontal with designed high stiffness for high frequency driving and high performance. With two piezoelectric elements 220 and 221, the stiffness of the whole driver is further enhanced, because piezoelectric ceramic materials normally have higher stiffness than metal. Two piezoelectric elements 220 and 221 are connected to two individual friction portions 250 and 251. To achieve the stiffness enhancement in the working cycles, when one piezoelectric element expands, the other one would contract simultaneously and vice versa. Also in this embodiment, the point 206 for preload applying is set in the middle of the driver, which is to be used to apply an equally force to the driver, and thus would achieve a stable speed and movement in both directions. The friction portion 250 and 251 are also made from wear-resistant materials or covered by wear-resistant coating to enhance the wear resistance, stability and lifetime during long term operation.

In all the embodiments above, a flexure portion is designed with parallel connected connection rods, with which the stiffness of the flexure portion could be adjusted by changing the number of the connection rods, width of each individual rod, space between two adjacent rods as well as the angle between the rods and the friction portion stroke direction. With high stiffness, the piezoelectric inertial driver could achieve fast response and high frequency driving for high speed traveling and high force output. With relative low stiffness, the piezoelectric inertial driver would be more preferred for low frequency, low speed driving.

Figure 6:
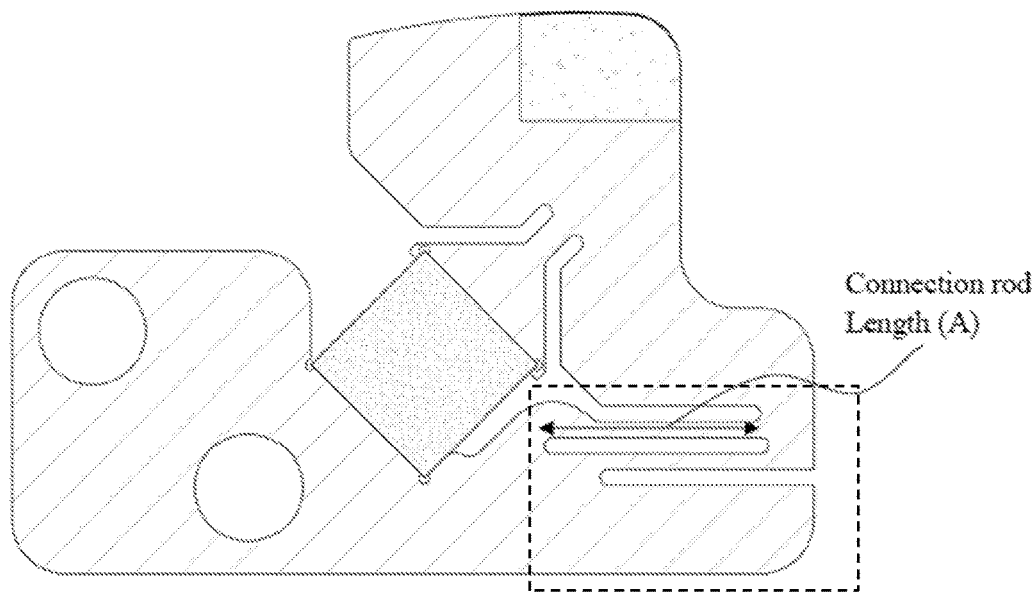
FIG. 6 illustrates the length of the connection rod in a piezoelectric inertial driver according to an embodiment.
Figure 7:
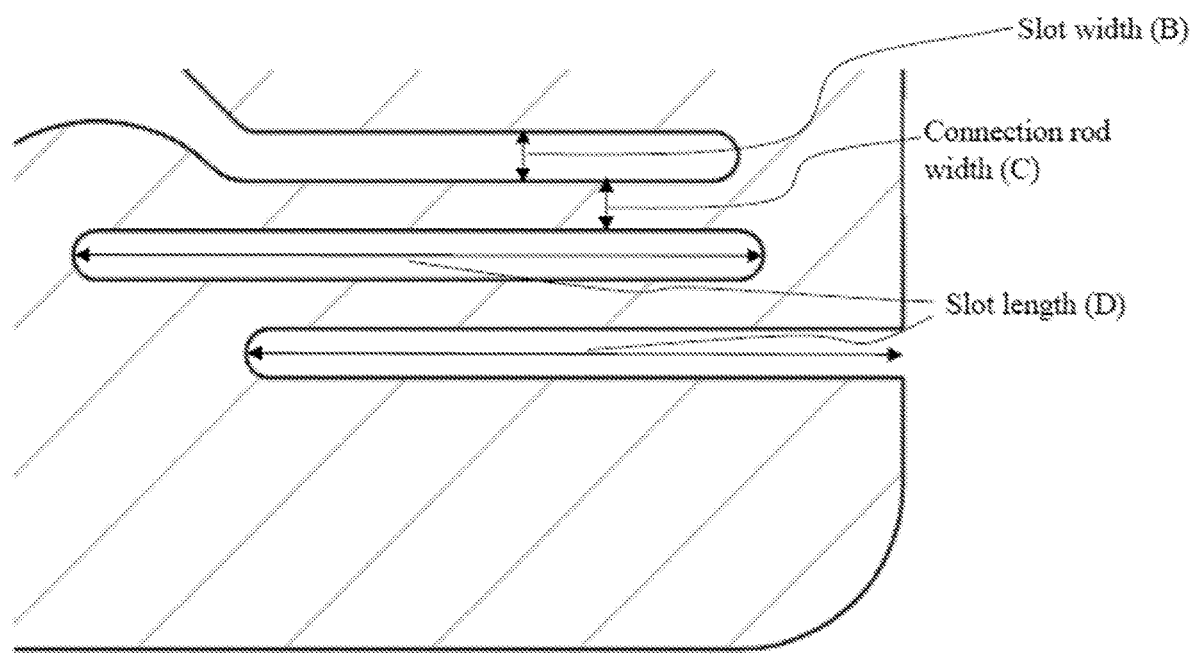
FIG. 7 is a magnified view of a portion of the piezoelectric inertial driver shown in FIG. 6.
Figure 8:
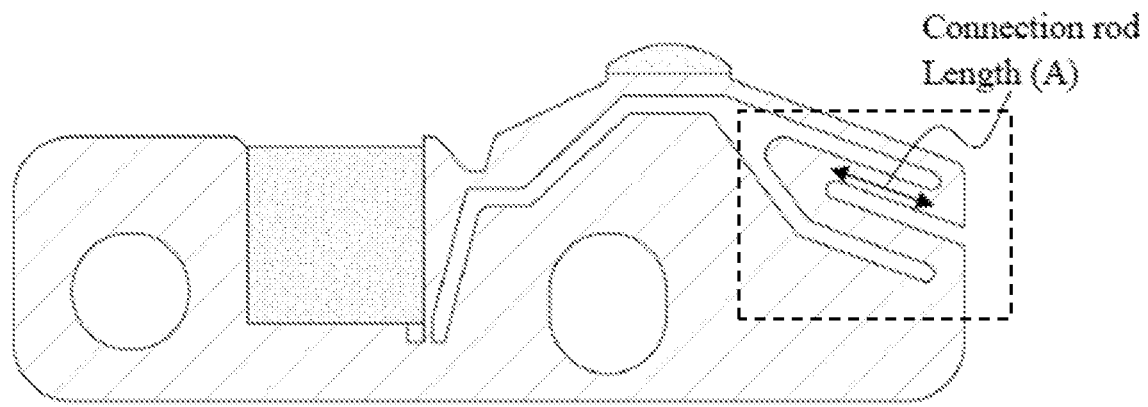
FIG. 8 illustrates the length of the connection rod in a piezoelectric inertial driver according to another embodiment.
Figure 9:
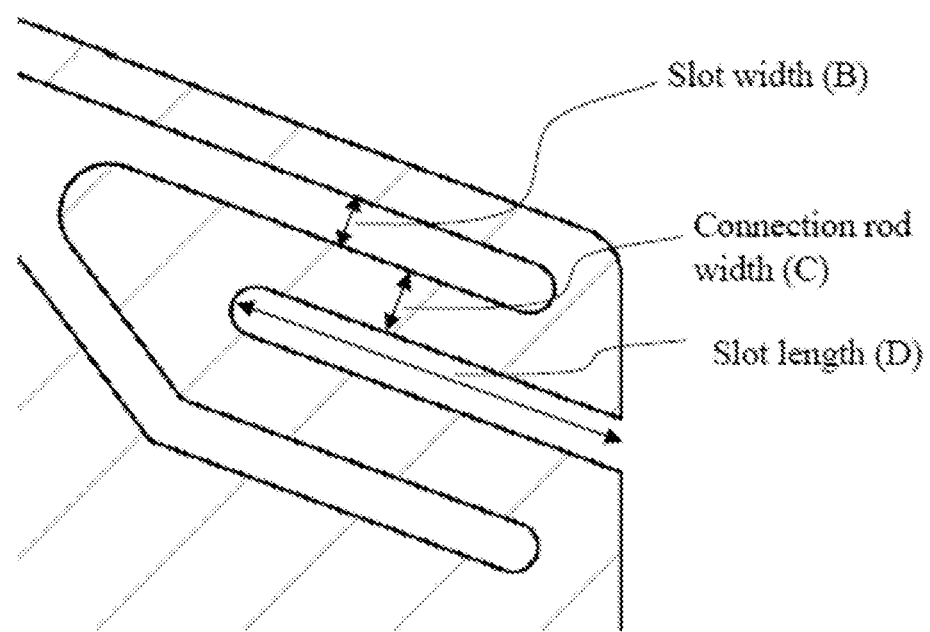
FIG. 9 is a magnified view of a portion of the piezoelectric inertial driver shown in FIG. 8.

FIGS. 6 and 7 show the dimensional parameters in a piezoelectric inertial driver according to an embodiment. FIG. 7 shows the details of the region bounded by the dash box in FIG. 6. FIGS. 8 and 9 show the dimensional parameters in a piezoelectric inertial driver according to another embodiment. FIG. 9 shows the details of the region bounded by the dash box in FIG. 8.

Note that increasing the slot width (B) would increase the stiffness of the structure, while increasing the connection rod width (C) would increase the stiffness of the structure. In one embodiment, the ratio between the slot width (B) and the connection rod width (C) is in the range of 0.4-2.5. Increasing the slot length (D) and the connection rod length (A) would decrease the stiffness of the structure, while decreasing the slot length and the connection rod length would increase the stiffness of the structure. In addition, the stiffness of the structure can be raised when more connection rods are used. Note that the stiffness of the structure would decrease when the ratio of connection rod length (A) to connection rod width (C) is increased. In one embodiment, the ratio of connection rod length (A) to connection rod width (C) is in the range of 10-16. Also, the stiffness of the structure would decrease when the ratio of slot length (D) to slot width (B) is increased. In one embodiment, the ratio of slot length (D) to slot width (B) is in the range of 10-16.

While the present invention has been described at some length and with some particularity with respect to the several described embodiments, it is not intended that it should be limited to any such particulars or embodiments or any particular embodiment, but it is to be construed so as to provide the broadest possible interpretation in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

The invention claimed is:

1. A piezoelectric inertial drive stage, comprising:
   a holder;
   a slider supported by the holder, the slider traveling on a smooth track with a travel range with respect to the holder;
   a piezoelectric inertial driver coupled to the holder and operable to move the slider;
   the piezoelectric inertial driver comprising:
      a mounting portion to connect the piezoelectric inertial driver to the holder;
      a friction portion configured to engage with the slider;
      a movement portion with a first end connected to a piezoelectric element and a second end connected to the friction portion;
      a piezoelectric element with a first end bonded to the mounting portion and a second end bonded to the movement portion; and
      a flexure portion with a first end connected to the mounting portion and a second end connected to the friction portion;
      wherein the flexure portion further comprises a plurality of connection rods with substantially parallel connections and separated by slots;
      wherein the movement portion transferring a motion of the piezoelectric element to the friction portion to drive the slider.

2. The piezoelectric inertial drive stage of claim 1, wherein an angle tolerance between any of the two rods or slots is in the range from −20 degrees to +20 degrees.

3. The piezoelectric inertial drive stage of claim 1, wherein a ratio between a width of a rod and a width of a slot is in the range from 0.4 to 2.5.

4. The piezoelectric inertial drive stage of claim 1, wherein a ratio between an individual rod's length and width is in the range from 10 to 16.

5. The piezoelectric inertial drive stage of claim 1, further comprising a friction portion made from wear-resistant materials or covered by wear resistant coating.

6. The piezoelectric inertial drive stage of claim 1, further comprising a slider partly or fully made from wear-resistant materials or covered by wear resistant coating.

7. The piezoelectric inertial drive stage of claim 1, further comprising:
   two or more piezoelectric elements, respective first and second ends of each bonded with its own mounting and movement portions; and
   one or more friction portions;
   wherein the number of friction portions is independent of the number of piezoelectric elements.

8. The piezoelectric inertial drive stage of claim 6, wherein the two or more piezoelectric elements are configured to operate cooperatively according to a predefined sequence.

9. The piezoelectric inertial drive stage of claim 1, wherein the motion of the piezoelectric element comprises a cycle of contraction and expansion, a speed of contraction being different from a speed of expansion.

10. A piezoelectric inertial driver comprising:
    a mounting portion to connect the piezoelectric inertial driver to a holder;
    a friction portion configured to engage with a slider;
    a movement portion with a first end connected to a piezoelectric element and a second end connected to the friction portion;
    a piezoelectric element with a first end bonded to the mounting portion and a second end bonded to the movement portion; and
    a flexure portion with a first end connected to the mounting portion and a second end connected to the friction portion;
    wherein the flexure portion further comprises a plurality of connection rods with substantially parallel connections and separated by slots;
    wherein the movement portion transferring a motion of the piezoelectric element to the friction portion to drive the slider.

11. The piezoelectric inertial driver of claim 10, wherein an angle tolerance between any of the two rods or slots is in the range from −20 degrees to +20 degrees.

12. The piezoelectric inertial driver of claim 10, wherein a ratio between a width of a rod and a width of a slot is in the range from 0.4 to 2.5.

13. The piezoelectric inertial driver of claim 10, wherein a ratio between an individual rod's length and width is in the range from 10 to 16.

14. The piezoelectric inertial driver of claim 10, further comprising a friction portion made from wear-resistant materials or covered by wear resistant coating.

15. The piezoelectric inertial driver of claim 10, further comprising a slider partly or fully made from wear-resistant materials or covered by wear resistant coating.

16. The piezoelectric inertial driver of claim 10, further comprising:
    two or more piezoelectric elements, respective first and second ends of each bonded with its own mounting and movement portions; and
    one or more friction portions;
    wherein the number of friction portions is independent of the number of piezoelectric elements.

17. The piezoelectric inertial driver of claim 14, wherein the two or more piezoelectric elements are configured to operate cooperatively according to a predefined sequence.

18. The piezoelectric inertial driver of claim 10, wherein the motion of the piezoelectric element comprises a cycle of contraction and expansion, a speed of contraction being different from a speed of expansion.

* * * * *